US010558754B2

(12) United States Patent
Razack et al.

(10) Patent No.: US 10,558,754 B2
(45) Date of Patent: Feb. 11, 2020

(54) METHOD AND SYSTEM FOR AUTOMATING TRAINING OF NAMED ENTITY RECOGNITION IN NATURAL LANGUAGE PROCESSING

(71) Applicant: Infosys Limited, Bangalore (IN)

(72) Inventors: Abdul Razack, Cupertino, CA (US); Sudipto Dasgupta, Bangalore (IN); Mayoor Rao, Mangalore (IN); John Kuriakose, Pune (IN)

(73) Assignee: Infosys Limited, Bangalore (IN)

( * ) Notice: Subject to any disclaimer, the term of this patent is extended or adjusted under 35 U.S.C. 154(b) by 0 days.

(21) Appl. No.: 15/473,424

(22) Filed: Mar. 29, 2017

(65) Prior Publication Data

US 2018/0075013 A1    Mar. 15, 2018

(30) Foreign Application Priority Data

Sep. 15, 2016    (IN) .............................. 201641031538

(51) Int. Cl.
*G06F 17/27*    (2006.01)
*G06N 5/02*    (2006.01)
*G06N 20/00*    (2019.01)

(52) U.S. Cl.
CPC .............. *G06F 17/278* (2013.01); *G06N 5/02* (2013.01); *G06N 20/00* (2019.01); *G06F 17/2785* (2013.01)

(58) Field of Classification Search
CPC .............. G06F 17/2775; G06F 17/278; G06F 17/2785; G06N 5/02
USPC .................. 704/1, 9; 707/737, 738, 755, 771
See application file for complete search history.

(56) References Cited

U.S. PATENT DOCUMENTS

| 7,444,351 B1 | 10/2008 | Nomiyama |
| 7,730,085 B2 | 6/2010 | Hassan et al. |
| 8,429,099 B1 * | 4/2013 | Perkowitz .............. G06Q 10/10 706/12 |
| 8,566,789 B2 | 10/2013 | Siddaramappa et al. |

(Continued)

OTHER PUBLICATIONS

Meystre et al., "Extracting Information from Textual Documents in the Electronic Health Record: A Review of Recent Research," *IMIA Yearbook of Medical Informatics 2008*, from: imia.schattanuer.de, 2008, pp. 128-144.

(Continued)

*Primary Examiner* — James S Wozniak
(74) *Attorney, Agent, or Firm* — Klarquist Sparkman, LLP

(57) ABSTRACT

A method and system automates training named entity recognition in natural language processing to build configurable entity definitions includes receiving input documents or entities through an administration module and defining a domain for each entity. Further, one or more entities corresponding to the domain specific entity in the received documents are determined and a training file to one of pick a right parser, extract content and label the entity ambiguity is generated. One or more user actions are collected and maintained at a repository through a knowledge engine. Still further, one or more labelled ambiguous words are predicted and the knowledge engine is updated. Data may be fetched, through a training pipeline execution engine and each entity may be associated with one or more documents based on the fetched data from the document store to build configurable entity definitions.

17 Claims, 12 Drawing Sheets

(56) References Cited

U.S. PATENT DOCUMENTS

| | | | |
|---|---|---|---|
| 8,594,996 B2 | 11/2013 | Liang et al. | |
| 8,645,122 B1* | 2/2014 | Di Fabbrizio | G10L 21/00 704/231 |
| 8,700,604 B2* | 4/2014 | Roseman | G06F 17/278 707/716 |
| 9,058,374 B2 | 6/2015 | Brennan et al. | |
| 9,135,238 B2 | 9/2015 | Bunescu et al. | |
| 9,183,173 B2 | 11/2015 | Yih et al. | |
| 9,224,103 B1 | 12/2015 | Subramanya et al. | |
| 9,589,049 B1* | 3/2017 | Carrier | G06F 16/3329 |
| 9,779,363 B1* | 10/2017 | Hansen | G06N 99/005 |
| 2003/0101047 A1* | 5/2003 | Panttaja | G06F 17/2785 704/9 |
| 2003/0233223 A1* | 12/2003 | Wang | G06F 17/278 704/4 |
| 2004/0015483 A1* | 1/2004 | Hogan | G06F 17/30011 |
| 2005/0038770 A1* | 2/2005 | Kuchinsky | G06F 17/2775 |
| 2006/0224565 A1* | 10/2006 | Ashutosh | G06F 17/30705 |
| 2009/0063145 A1* | 3/2009 | Hakkani-Tur | G10L 15/1822 704/243 |
| 2009/0077122 A1* | 3/2009 | Fume | G06F 17/3064 |
| 2009/0144609 A1* | 6/2009 | Liang | G06F 17/278 715/230 |
| 2009/0299977 A1 | 12/2009 | Rosales | |
| 2010/0287210 A1* | 11/2010 | Olof-Ors | G06F 17/278 707/803 |
| 2011/0010685 A1* | 1/2011 | Sureka | G06F 8/34 717/102 |
| 2011/0282890 A1* | 11/2011 | Griffith | G06F 17/3064 707/758 |
| 2012/0084235 A1* | 4/2012 | Suzuki | G06N 99/005 706/12 |
| 2012/0084340 A1* | 4/2012 | McCormack | G06Q 30/01 709/203 |
| 2012/0197914 A1* | 8/2012 | Harnett | G06F 17/30637 707/755 |
| 2012/0303557 A1* | 11/2012 | Lu | G06N 99/005 706/12 |
| 2012/0310868 A1 | 12/2012 | Martins | |
| 2013/0173604 A1* | 7/2013 | Li | G06F 17/30687 707/723 |
| 2013/0212081 A1* | 8/2013 | Shenoy | G06F 17/30657 707/706 |
| 2013/0262086 A1* | 10/2013 | Kim | G06Q 30/0256 704/9 |
| 2014/0046653 A1 | 2/2014 | Gopalkrishnan et al. | |
| 2014/0136504 A1* | 5/2014 | Shum | G06F 17/30864 707/706 |
| 2014/0136518 A1* | 5/2014 | Shum | G06F 17/30991 707/722 |
| 2014/0142922 A1 | 5/2014 | Liang et al. | |
| 2015/0154195 A1* | 6/2015 | Lightner | G06F 17/3053 707/750 |
| 2015/0161242 A1* | 6/2015 | Visotski | G06F 17/30663 707/730 |
| 2016/0055845 A1* | 2/2016 | Ikawa | G10L 15/063 704/202 |
| 2016/0078014 A1* | 3/2016 | Avasarala | G06F 17/241 704/9 |
| 2016/0085741 A1* | 3/2016 | Blanchflower | G06F 17/278 704/9 |
| 2016/0085856 A1* | 3/2016 | Hall | G06F 17/243 706/46 |
| 2016/0117072 A1* | 4/2016 | Sharifi | G06F 3/04842 715/769 |
| 2016/0180216 A1* | 6/2016 | Allen | G06F 17/30675 706/46 |
| 2017/0068903 A1* | 3/2017 | Hakkani-Tur | G06N 99/005 |
| 2017/0098013 A1* | 4/2017 | Shirwadkar | G06F 17/30979 |
| 2017/0161268 A1* | 6/2017 | Badaskar | G06F 17/3005 |
| 2017/0192958 A1* | 7/2017 | Misra | G06F 17/278 |
| 2017/0199963 A1* | 7/2017 | Kondadadi | G06F 19/322 |
| 2017/0262412 A1* | 9/2017 | Liang | G06F 17/278 |
| 2017/0278514 A1* | 9/2017 | Mathias | G10L 15/22 |
| 2018/0032503 A1* | 2/2018 | Swart | G06F 17/278 |

OTHER PUBLICATIONS

Embley et al., "Ontology-Based Extraction and Structuring of Information from Data-Rich Unstructured Documents," *CIKM 98*, Copyright ACM 1998, pp. 52-59.

Turian et al., "Word representations: A simple and general method for semi-supervised learning," *Proceedings of the 48th Annual Meeting of the Association for Computational Linguistics*, pp. 384-394, Uppsala, Sweden, Jul. 11-16, 2010.

Collobert et al., "Natural Language Processing (almost) from Scratch," arXiv:1103.0398v1 [cs.LG] Mar. 2, 2011, 47 pages.

Ratinov et al., "Design Challenges and Misconceptions in Named Entity Recognition," *CoNLL '09*, University of Illinois, Urbana, IL, 9 pages.

Fan et al., "Automatic Knowledge Extraction from documents," IBM Journal of Research and Development, vol. 56, Issue 3:4, 10 pages.

\* cited by examiner

Data Science    NLP Processing    Training    Clear Ambiguity    Approve Successful

<Clear Ambiguity-Skill refine>

Domain: HR_NEW

✓ X
Built on Hadoop and hive, the backend does intensive amount of processing on huge input data fees and arrange them using dimensional data modeling ✓ X
Appreciation and Awards Multiple Divisional Recognition and Spontaneous Recognition Awards at Intel India for quality contributions and excellence ✓ X
Program was aimed at understanding customers behavior on their paths to purchase and at historical trend analysis, in turn helping in optimized mark ✓ X
Designed reference POCs for Big Data Frameworks like hive, Flume, HDGS-Proxy and Sqoop ✓ X
(+91) 9980989430 Expertise in designing, building and implementing applications using Big-Data Hadoop technology Summary of Qualifications Broad-ba ✓ X
(+91) 9980989430 Expertise in designing, building and implementing applications using Big-Data Hadoop technology Summary of Qualifications Broad-ba ✓ X
Working on dataflow, transformation logics and implementation, materializing schemas to hive Warehouse, data cleaning over a 250TB Clouder Hadoop (C ✓ X
Strong experience with Big Data technologies having knowledge and hands on experience on Hadoop ecosystem tools like hive, Hbase, Pig, Sqoop, Flume, ✓ X
COMPENTENCITES BIG DATA TECHNOLOGIES Apache Hadoop, Cloudera CDH, Hortonworks, Amazon ETL TOOLS LANGUAGES DATABASE ACCOLADES Web Service EC2,

FIGURE 11

METHOD AND SYSTEM FOR AUTOMATING TRAINING OF NAMED ENTITY RECOGNITION IN NATURAL LANGUAGE PROCESSING

FIELD OF TECHNOLOGY

The present disclosure relates to methods and systems for natural language processing and, more particularly, to automating named entity recognition in natural language processing.

BACKGROUND

With the proliferation of information generated daily and accessible to users over the Web, the need for intelligent electronic assistants to aid in locating and/or discovering useful or desired information amongst the morass of data is paramount. The use of natural language processing to search text to correctly recognize people, places, or things is fraught with difficulties.

A named entity, such as a person, place, object or other named entity may be a member of a class or type. For example, a person called "John Wayne" may be an example of the class "person". For example, a place called "Mexico City" may be an example of the class "city". Automated systems for recognizing named entities are able to extract named entities from digital documents and classify those named entity mentions into one or more pre-specified categories such as person, city, automobile, and others. Named entity results may then be used for many downstream purposes such as improving information retrieval systems, knowledge extraction systems and many others.

First, natural language is ambiguous. Almost every English word or phrase can be a place name somewhere in the world or a name of a person (i.e., a "person name"). Furthermore, many entities share the same name. For example, there are more than 20 cities named "Paris" in the United States. A person named "Will Smith," could refer to the Hollywood movie actor and musician, the professional football player in the NFL, or many other people. Recognizing non-celebrity names has become more important with the exponential growth of the Web content, especially user created content such as blogs, Wikipedia, and profiles on social network sites like MySpace and FaceBook.

Second, an entity could be mentioned or referred to in many different ways (e.g., pronouns, synonyms, aliases, acronyms, spelling variations, nicknames, etc.) in a document. Third, various knowledge sources about entities (e.g. dictionary, encyclopedia, Wikipedia, gazetteer, etc.) exist, and the size of these knowledge bases are extensive (e.g. millions of person names and place names). The sheer quantity of data is prohibitive for many natural language processing techniques.

Accordingly, there is a need of an automating natural language processing technique which may handle unstructured data.

SUMMARY

Disclosed are a method and/or a system automating named entity recognition in natural language processing.

In one aspect, a method to automate training named entity recognition in natural language processing to build configurable entity definitions includes receiving documents or entities through an administration module and defining a domain for each received entity. Further, one or more entities corresponding to the domain specific entity in the received documents are determined and a training file to at least one of pick a right parser, extract content and label the entity ambiguity is generated. One or more user actions are collected and maintained at a repository through a knowledge engine. Still further, one or more labelled ambiguous words are predicted and the knowledge engine is updated. Data may be fetched, through a training pipeline execution engine and each entity may be associated with one or more documents based on the fetched data from the document store to build configurable entity definitions.

In another aspect, a system to automate training named entity recognition in natural language processing to build configurable entity definitions includes the cluster computing network with one or more communicatively coupled nodes, the high throughput distributed messaging system, the distributed data warehouse, the data processing engine, an analytical engine, one or more processors and one or more memory units operatively coupled to one or more processors communicatively coupled over the cluster computer network. The one or more processors execute instructions stored thereon, when executed by the one or more processors, cause the one or more processors to receive documents through an administration module associated with the high throughput distributed messaging system to define the domain for an entity, and entity names through the module in a document set.

Further, the one or more processors determine one or more entities, through the data processing engine, corresponding to the domain specific entity in the document set and generate, through the analytical engine, a training file to pick one of a right parser, extract content and label the entity ambiguity. Still further, the one or more processors collect and maintain, through a knowledge engine associated with the distributed data warehouse, one or more user actions in a repository. The one or more processors predict, through the knowledge engine and the analytical engine, one or more labelled ambiguous words.

The one or more processors update, through the cluster computing network, the knowledge engine through the collected one or more user actions and fetch through a training pipeline execution engine, data stored on a document store. Also, the one or more processors associate, through the training pipeline execution engine, each entity with one or more documents based on the fetched data from the document store to build configurable entity definitions.

The methods and systems disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

The embodiments of the present invention are illustrated by way of example and not as limitation in the figures of the accompanying drawings, in which like references indicate similar elements and in which:

FIG. 11 is a screenshot illustrating ambiguity clearance, according to one or more embodiments.

Other features of the present embodiments will be apparent from the accompanying drawings and from the detailed description that follows.

DETAILED DESCRIPTION

Example embodiments, as described below, may be used to provide a method, an apparatus and/or a system of automating training of named entity recognition in natural language processing. Although the present embodiments have been described with reference to specific example embodiments, it will be evident that various modifications and changes may be made to these embodiments without departing from the broader spirit and scope of the various embodiments.

Figure 1:
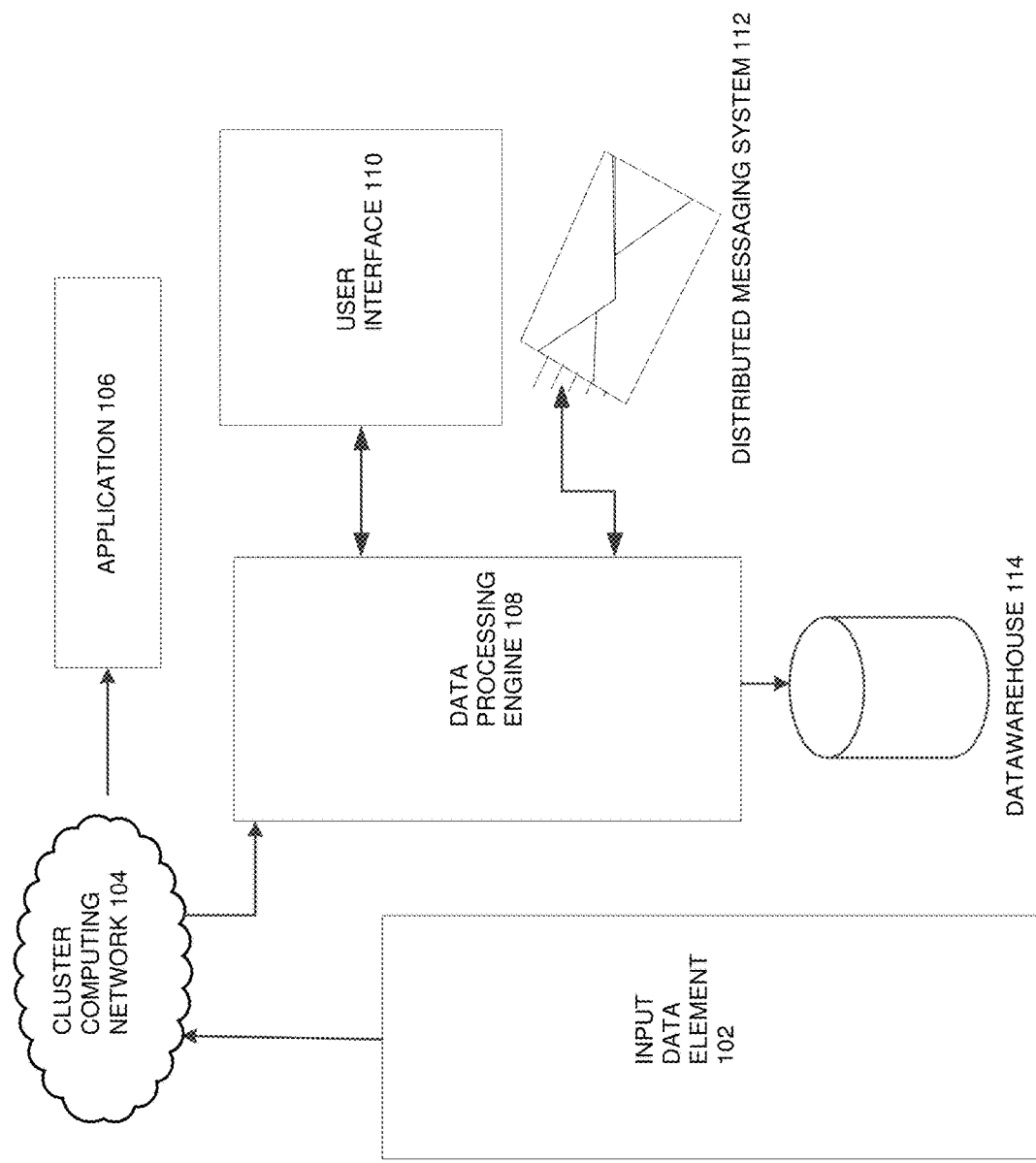
FIG. 1 illustrates a system to automate training named entity recognition in natural language processing, according to one embodiment.

FIG. 1 illustrates a system to automate training named entity recognition in natural language processing, according to one embodiment. The system includes an input data element 102, cluster computing network 104, application 106, data processing engine 108, user interface 110, distributed messaging system 112, and data warehouse 114. In one or more embodiments, a system to automate training named entity recognition in natural language processing to build configurable entity definitions includes the cluster computing network 104 with one or more communicatively coupled nodes, the high throughput distributed messaging system 112, the distributed data warehouse 114, the data processing engine 108, an analytical engine, one or more processors and one or more memory units operatively coupled to one or more processors communicatively coupled over the cluster computer network. The one or more processors may execute instructions stored thereon, when executed by the one or more processors, may cause the one or more processors to receive documents through an administration module associated with the high throughput distributed messaging system 112 to define the domain for an entity, and entity names through the module in a document set.

Further, the one or more processors determine one or more entities, through the data processing engine 108, corresponding to the domain specific entity in the document set and generate, through the analytical engine, a training file to at least one of pick a right parser, extract content and label the entity ambiguity. Still further, the one or more processors may collect and maintain, through a knowledge engine associated with the distributed data warehouse 114, one or more user actions in a repository. The one or more processors may predict, through the knowledge engine and the analytical engine, one or more labelled ambiguous words.

The one or more processors may update, through the cluster computing network 104, the knowledge engine through the collected one or more user actions and fetch through a training pipeline execution engine, data stored on a document store. Also, the one or more processors may associate, through the training pipeline execution engine, each entity with one or more documents based on the fetched data from the document store to build configurable entity definitions.

In one or more embodiments, the one or more documents may be stored in the document store, which may be fetched during association.

In one or more embodiments, the data stored on the document store may be a domain information, an entity information, and/or the one or more user actions.

In one or more embodiments, entities may be defined in a knowledge repository.

In one or more embodiments, the knowledge repository may be an ontology knowledge base. The entities may be ranked through a relevance score. The user actions may be collected through a user interface associated with one or more of a web and mobile application. The knowledge engine may be updated at pre-defined intervals. In one or more embodiments, the pre-defined intervals may defined by a user or may be defined by a system as configured by the user.

In an embodiment, unstructured data may be data related to domain documents obtained from an end user as input.

In various embodiments, the method includes a text extraction module configured to extract unstructured data, and/or clean up data. Further, the method may employ supervised training to gather user inputs and create the training model.

The trained model from the training phase may be used in a discovery phase to annotate and extract words of interest from a user input document. A training text corpus from a set a documents may be automatically created. The user is allowed to rectify an ambiguity when same word may mean different things in different contexts. The user involvement may allow for removal of ambiguity by highlighting ambiguous words to the user. Further, a training output model may be generated with metadata. The training output model may be used for identifying a noun from any other document given as input.

In an example embodiment, the text extraction module comprises a text crawler for traversing through document and text corpus, and a content extractor and formatter for cleaning out unwanted text in the input document.

In an embodiment, a text extraction module may comprise a technique of extracting text and leaving behind all the non-printable characters, further store the raw content in a new file.

The source of data may be PDF documents, XML data, Word documents, Text files and the like. Further, the method includes a pluggable interface, which may allow user to externally plug any format specific utility to predicament the content from the input file formats.

In an embodiment, the cluster computing network may be associated with a varying number of nodes.

In an embodiment, an administration module may be used to configure domain specific category and entity. Further, configuration may include a technique to integrate with the text extraction module and configure entity definitions. The entity definitions may be used to create a training corpus for learning and modelling with minimal supervision.

In an embodiment, the relevant input document may be cleansed and saved as a new file. A look-up operation may be performed to identify the domain category definition of sentences.

In an embodiment, a configurable processor may be used to pick right parser, extract content and label the entity ambiguity. The configurable processor may enable certain rules to be applied to sentences. Sentences categorized as ambiguous may be detected from the relevant category definition. The categorized sentences may be stored in a separate document for disambiguation with user inputs on a graphical user interface for corrective action. The user actions may be saved on a knowledge engine as a domain specific entity repository.

In case of non-ambiguous sentence or word, sentences may be is saved in a category file of the knowledge engine. If no match is found for the word against the category definition, the word may be marked with a default value. The end of the above technique may have two output files, one with all the categories marked and another one with ambiguity. The two output files may be the training input files.

In various embodiments of the present invention, the method includes analysis of the given text corpus and also definition of sentence boundary by a method of applying rules, once removal of all the non-printable characters is complete.

In case of unstructured data, the text may not have any punctuations, which often is best way to find the sentence boundary, hence the method herein may involve user input through a graphical user interface to define the configuration and identify the sentence boundary.

In an example embodiment, the system may use a knowledge engine. The knowledge engine may: maintain a repository of all user actions, predict the labelled ambiguous words, continually gather user input on ambiguous entities, and update the engine.

A training pipeline execution engine may be a part of the system used to fetch data from the document store, run processor over each corresponding entity, and identifying one or more documents associated with the entity.

In various embodiments of the present invention, a training input file to create the trained model may use any known NLP tools. A "named entity recognition" execution engine, uses an automated trained model on the continuous stream of documents, and extracting the entities. In one or more embodiments, a named entity may be a real world object such as persons, locations, organizations, or products that can be denoted with a proper noun. Further, the method may involve extraction of metadata from context and document save. The input document may be run through a name entity extraction process using the training model created. The extracted entity may represent the required metadata, and the content is further saved with the extracted metadata. The metadata may be searchable and is used for document classification, calculating similarity between the documents and grouping the documents under different categories.

Figure 2:
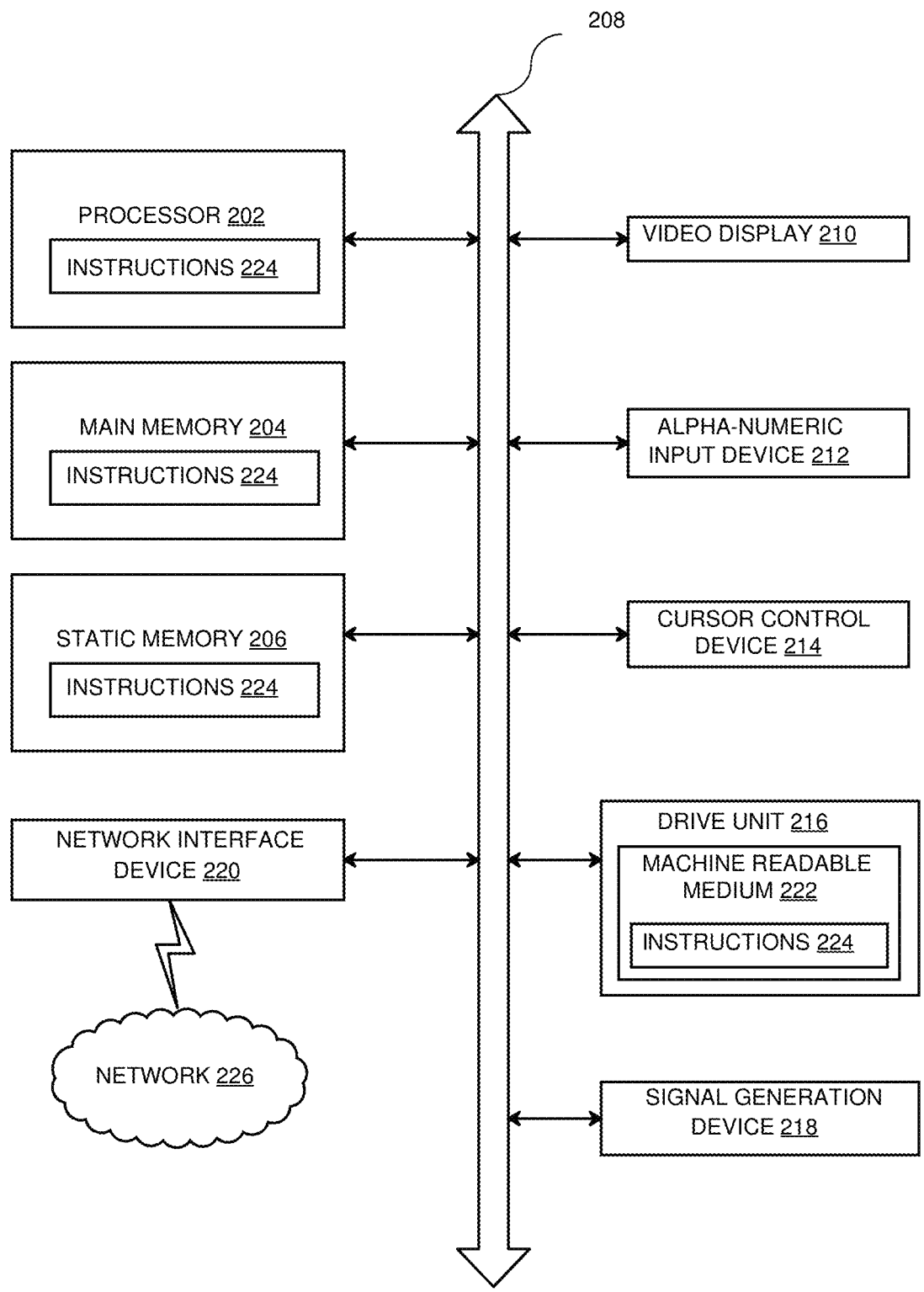
FIG. 2 is a diagrammatic representation of a data processing system capable of processing a set of instructions to perform any one or more of the methodologies herein, according to one embodiment.

FIG. 2 is a diagrammatic representation of a data processing system capable of processing a set of instructions to perform any one or more of the methodologies herein, according to an example embodiment. FIG. 2 shows a diagrammatic representation of machine in the example form of a computer system 200 within which a set of instructions, for causing the machine to perform any one or more of the methodologies discussed herein, may be executed. In various embodiments, the machine operates as a standalone device and/or may be connected (e.g., networked) to other machines.

In a networked deployment, the machine may operate in the capacity of a server and/or a client machine in server-client network environment, and or as a peer machine in a peer-to-peer (or distributed) network environment. The machine may be a personal-computer (PC), a tablet PC, a set-top box (STB), a Personal Digital Assistant (PDA), a cellular telephone, a web appliance, a network router, switch and or bridge, an embedded system and/or any machine capable of executing a set of instructions (sequential and/or otherwise) that specify actions to be taken by that machine. Further, while only a single machine is illustrated, the term "machine" shall also be taken to include any collection of machines that individually and/or jointly execute a set (or multiple sets) of instructions to perform any one and/or more of the methodologies discussed herein.

The example computer system includes a processor 202 (e.g., a central processing unit (CPU) a graphics processing unit (GPU) and/or both), a main memory 204 and a static memory 206, which communicate with each other via a bus 208. The computer system 200 may further include a video display unit 210 (e.g., a liquid crystal displays (LCD) and/or a cathode ray tube (CRT)). The computer system 200 also includes an alphanumeric input device 212 (e.g., a keyboard), a cursor control device 214 (e.g., a mouse), a disk drive unit 216, a signal generation device 218 (e.g., a speaker) and a network interface device 220.

The disk drive unit 216 includes a machine-readable medium 222 on which is stored one or more sets of instructions 224 (e.g., software) embodying any one or more of the methodologies and/or functions described herein. The instructions 224 may also reside, completely and/or at least partially, within the main memory 204 and/or within the processor 202 during execution thereof by the computer system 200, the main memory 204 and the processor 202 also constituting machine-readable media.

The instructions 224 may further be transmitted and/or received over a network 226 via the network interface device 220. While the machine-readable medium 222 is shown in an example embodiment to be a single medium, the term "machine-readable medium" should be taken to include a single medium and/or multiple media (e.g., a centralized and/or distributed database, and/or associated caches and servers) that store the one or more sets of instructions. The term "machine-readable medium" shall also be taken to include any medium that is capable of storing, encoding and/or carrying a set of instructions for execution by the machine and that cause the machine to perform any one or more of the methodologies of the various embodiments. The term "machine-readable medium" shall accordingly be taken to include, but not be limited to, solid-state memories, optical and magnetic media, and the like. The term "machine-readable medium" does not refer to signals.

Figure 12:
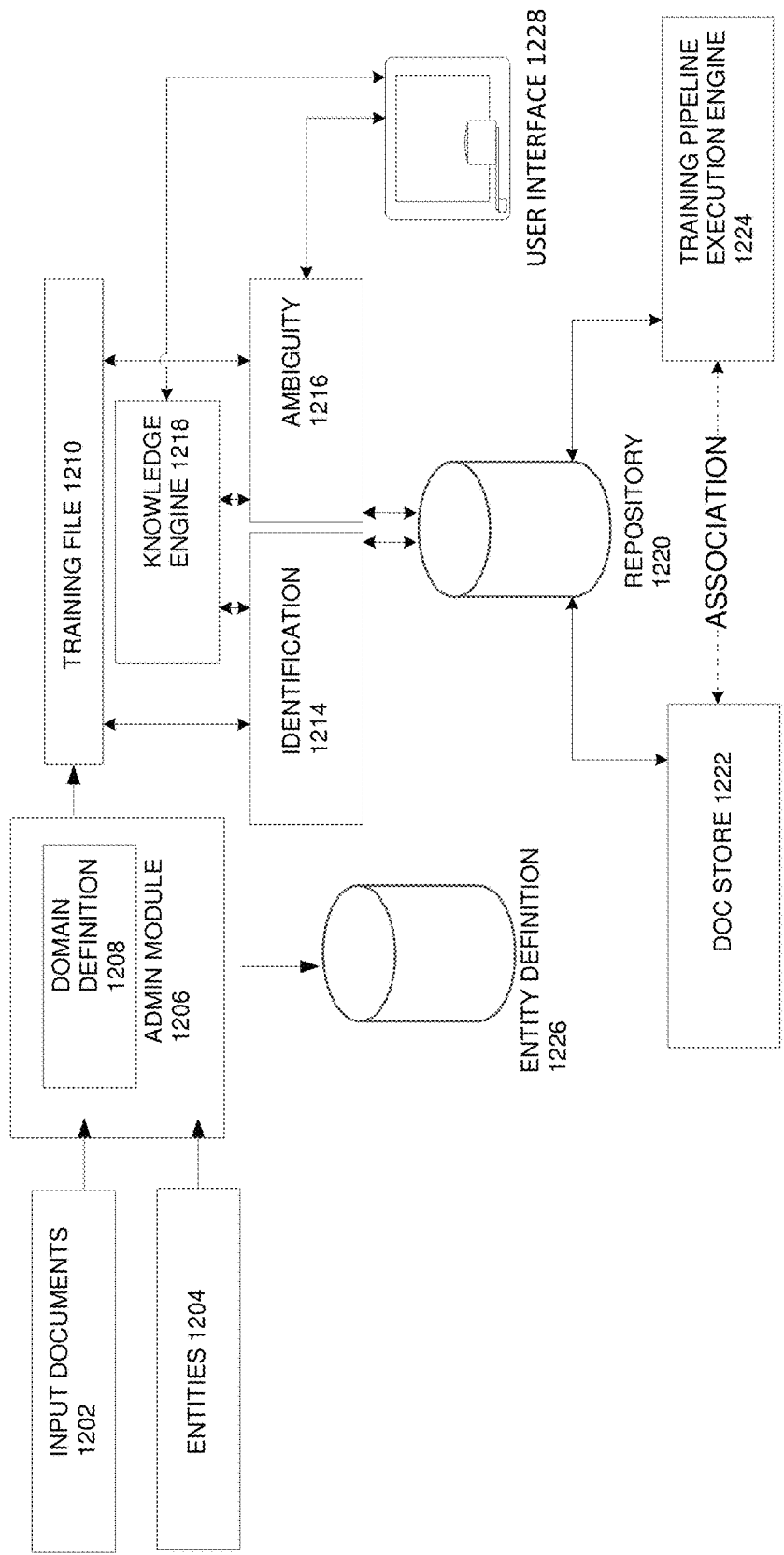
FIG. 12 is a system diagram detailing the flow of data through an automated trained entity recognition system to build configurable entity definitions, according to one or more embodiments.

FIG. 12, is a system diagram detailing the flow of data through an automated trained entity recognition system to build configurable entity definitions, according to one or more embodiments. The system receives input documents 1202 or entities 1204 as input at an administration module 1206. The administration module may be associated with a domain definition module 1208. A domain may be defined for each entities received at the administration module 1208.

One or more entities corresponding to the domain specific entity may be determined through an entity definition list 1226. A training file 1210 may be generated to one or more of pick a right parser, extract content, and label entity ambiguity. Extracted entities may be labeled as one of identified 1214 or ambiguous 1216 through the training file 1210 in association with the knowledge engine 1218. Ambiguities 1216 may be thrown onto a user interface 1228 to receive as input a resolution of the ambiguity. The resolution may be machine based through domain ontologies or user input based. The resolution of ambiguity may be updated in the knowledge engine 1218. The user action to resolve ambiguity may also be collected and maintained at a repository 1220. The knowledge engine 1218 may predict one or more labeled ambiguous words associated with ambiguity 1216. Data stored on a document store 1222 may be fetched though a training pipeline execution engine 1224. Each entity may be associated with one or more documents through the training pipeline execution engine 1224 based on the fetched data from the document store 1222 to build configurable entity definitions.

In one or more embodiments, each entity may be associated, through the training pipeline execution engine, with one or more documents based on a trained model generated through the training file and the fetched data from a document store.

Figure 3:
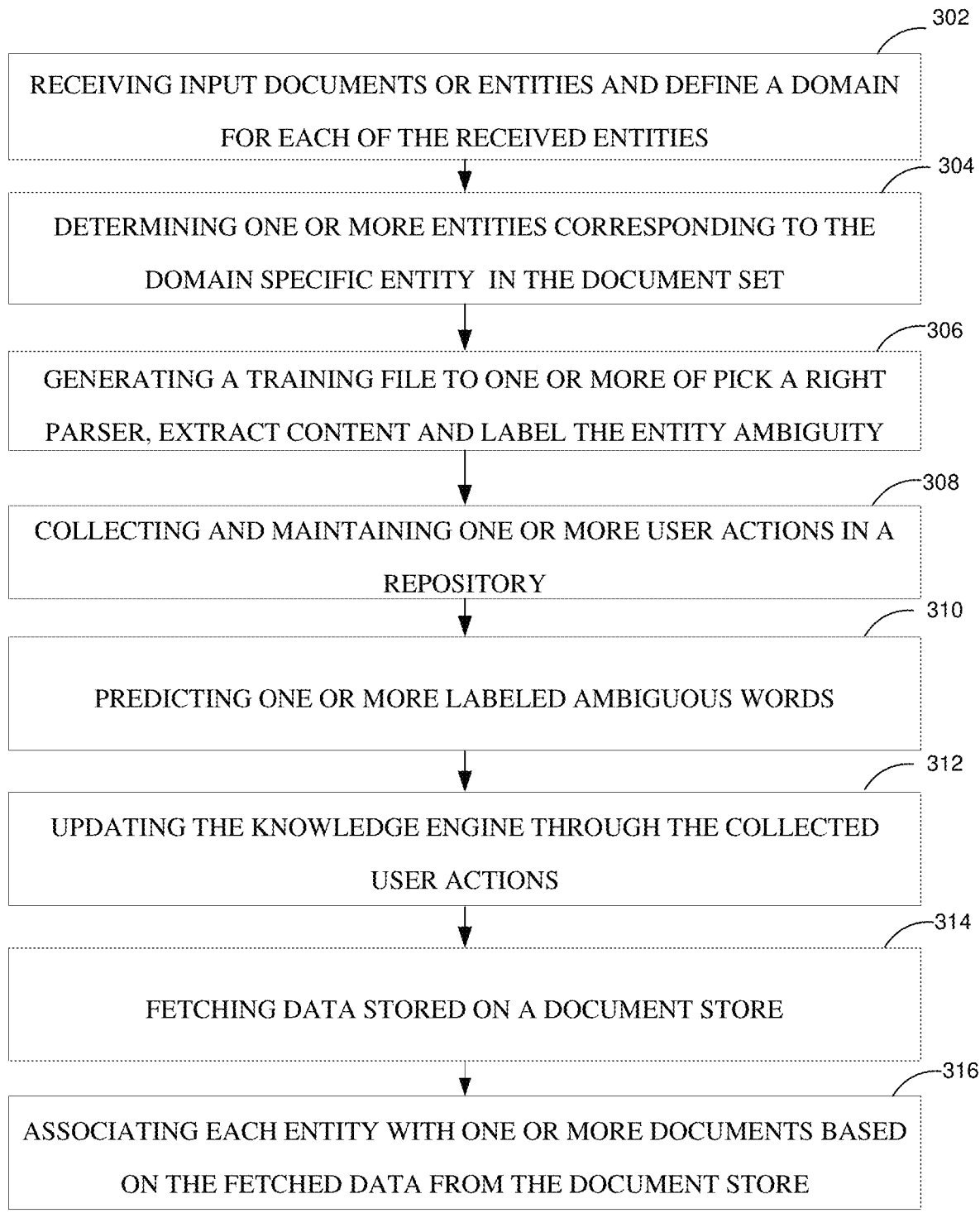
FIG. 3 is a process flow diagram detailing the operations of a method to automate training named entity recognition in natural language processing to build configurable entity definitions, according to one embodiment.

FIG. 3, is a process flow diagram detailing the operations of a method to automate training named entity recognition in natural language processing to build configurable entity definitions, according to one embodiment. The method may include receiving input documents through an administration module and defining a domain for each of the received entities, as in step 302. In one or more embodiments, the input received at the administration module may also be, but not limited to a keyword, a text selected from a document, or a search string. In another embodiment, input documents may be a document set or a documents including but not limited to .doc, .docx, .xlx, .txt and .pdf formats. Further, the input may also include one or more entity names or entities to be searched. Still further, one or more entities corresponding to the domain specific entity in the document set are determined for the input, as in step 304. The determination step may decide whether the system identifies the one or more entities or not. The training file to pick a right parser, extract content and label the entity ambiguity is generated, as in step 306.

In one or more embodiments, if the system identifies the one or more entities, the one or more entities may be labelled as unambiguous. If the system is not able to identify the one or more entities, the one or more entities are labelled as ambiguous.

For example, if the administration module identifies an entity 'Rome' as a city, according to the knowledge engine, the entity is labelled as unambiguous. The system may be configured to learn in the process of determination and the entity may be stored in the repository.

In one or more embodiments, the one or more entities corresponding to the domain specific entity may be determined based on domain ontology. One or more user actions are collected and maintained at the repository through a knowledge engine as in step 308. In one or more embodiments, the entities, which are labelled as ambiguous are presented to a user through a user interface. The user may resolve the labelled ambiguous entities. In one or more embodiments, if an entity is not determined, the reason may be the domain details of the entity is not known to the system. Another reason may be, the domain of the entity is overlapping with more than one domains. For example, the entity 'Rome' may be a place or a name of a person. In such cases, the user may resolve the ambiguity. Still further, one or more labelled ambiguous words are predicted and the knowledge engine is updated, as in step 310. The one or more labelled ambiguous words are predicted automatically. Such a prediction may be accomplished by a process in machine learning system. Data may be fetched, through a training pipeline execution engine, as in step 312 and the knowledge engine may be updated with the one or more user actions, as in step 314. In any of the embodiments herein, the one or more user actions may be resolution of one or more ambiguities. When stored, the user action may take the form of a resolved ambiguity (e.g., information that permits resolution of later-encountered ambiguities). Each entity may be associated with one or more documents based on the fetched data from the document store 316.

For example, if the document (input document) received at the administration module contains 'Rome is a beautiful city' and 'Rome is a good guy', then Rome needs to be marked as both name of a person and a city. The system may fetch 'city' document and the 'name of a person' document, which may be one of the one or more documents, stored in the data store. In one or more embodiments, the 'city' document and the 'name of a person' document may be reference documents previously available to the system. Based on the data fetched from the data store which may contain user actions of resolution of ambiguity, the entity is associated with both 'city' document and 'name of a person' document.

Figure 4:
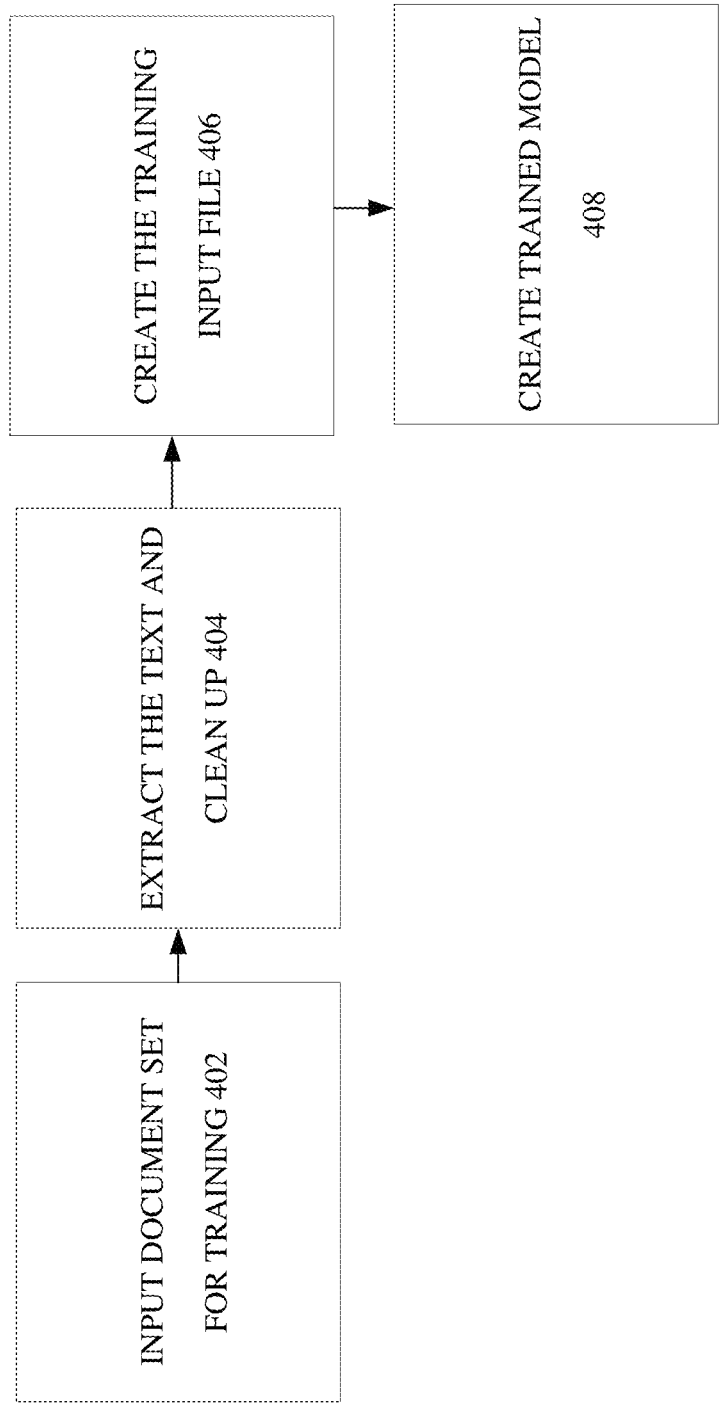
FIG. 4 illustrates the steps involved in training phase, according to one embodiment.

FIG. 4 illustrates the steps involved in training phase, according to one embodiment. Input document set for training 402 may be used to extract text and clean up 404 before creating a training file using one or more user definitions 406. A trained model may be created based on the training file during the training phase 408.

Figure 5:
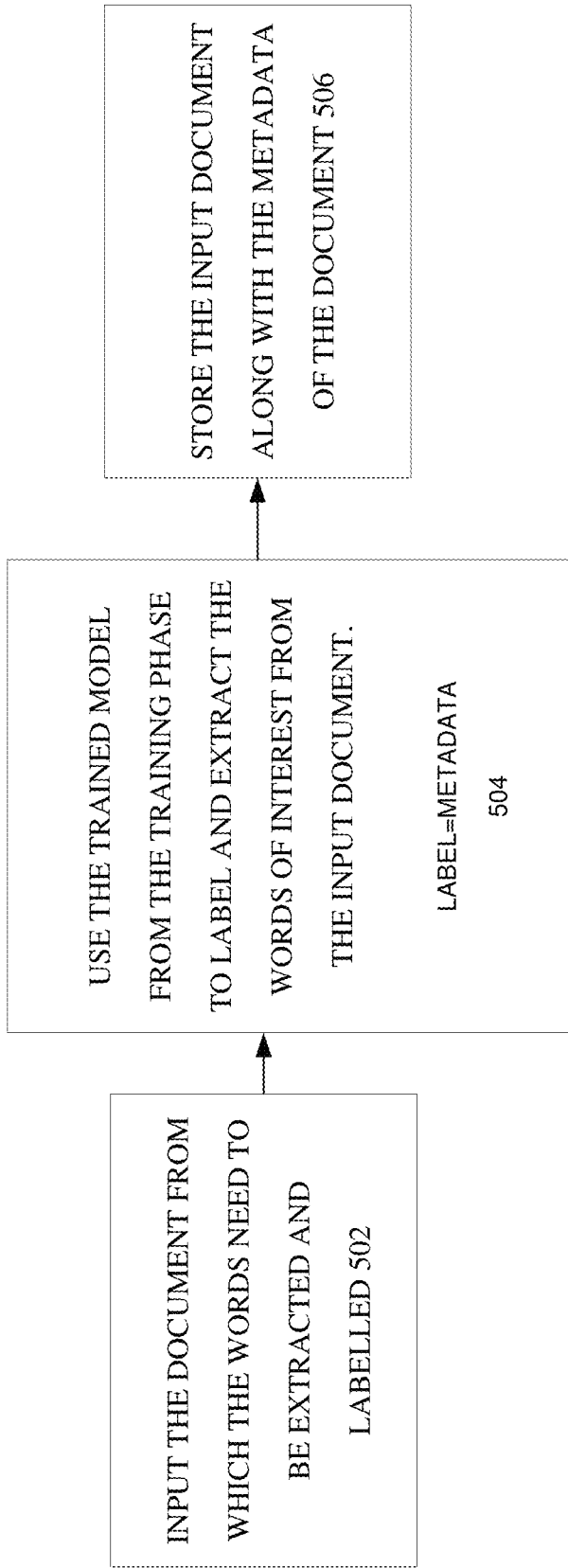
FIG. 5 illustrates the steps involved in discovery phase, according to one embodiment.

FIG. 5 illustrates the steps involved in discovery phase, according to one embodiment. The discovery phase may be a three step phase including receiving a document from which words need to be extracted and labeled 502. The trained model from the training phase may be used to label and extract words of interest from the input document. The document may be referred to as metadata 504. The input document may be stored along with the metadata of the document 506.

Figure 6:
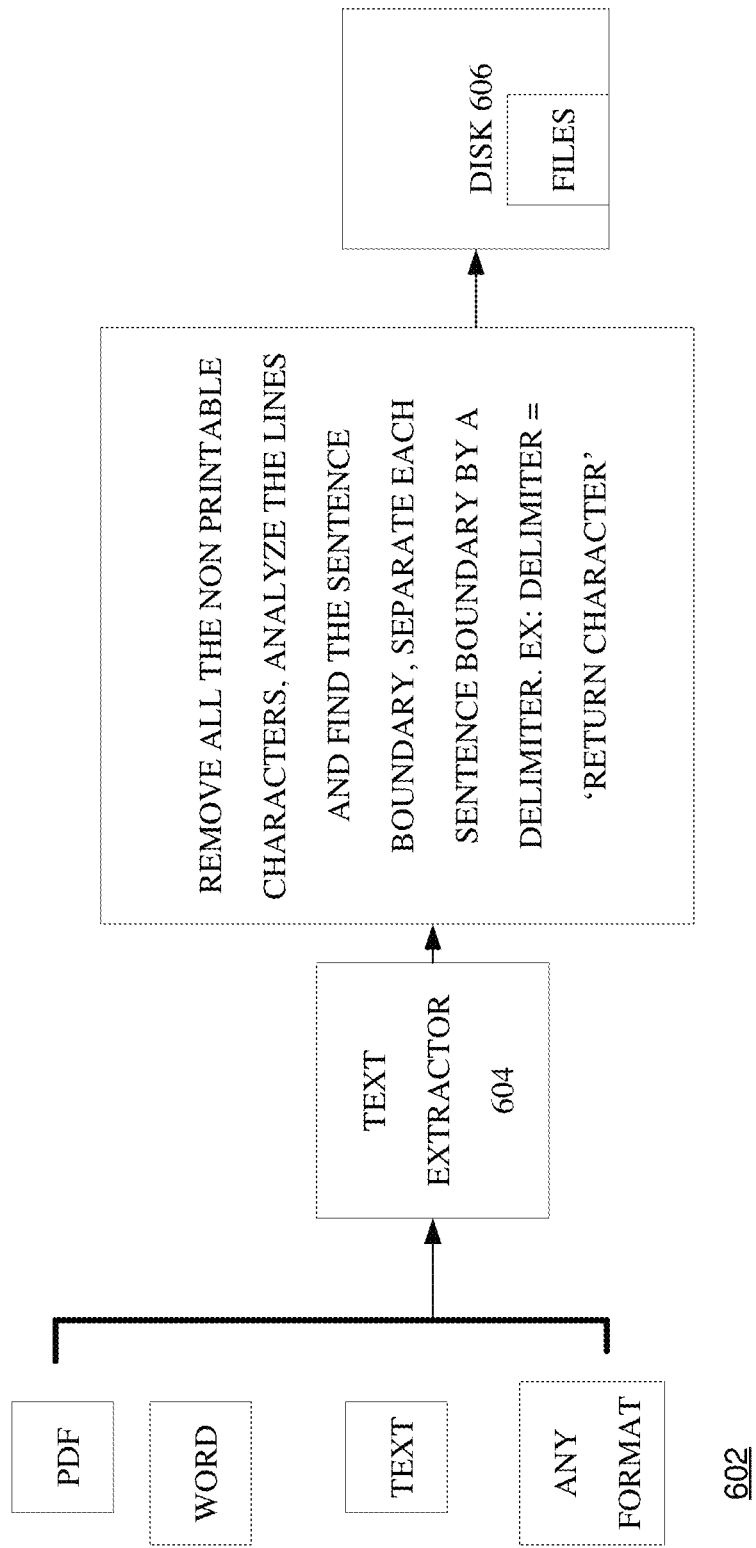
FIG. 6 illustrates the steps involved in extraction and clean up phase, according to one embodiment.

FIG. 6 illustrates the steps involved in extraction and clean up phase, according to one embodiment. Files of different formats such as PDF, Word, and text etc., 602 may be input to a text extractor. The text extractor 604 may remove all non-printable characters, analyze lines and find sentence boundaries. Further, the text extractor may separate each sentence boundary by a delimiter. The delimiter may be a 'return' character and/or a '.'. The extracted and cleaned data may be stored onto a disk 606.

Figure 7:
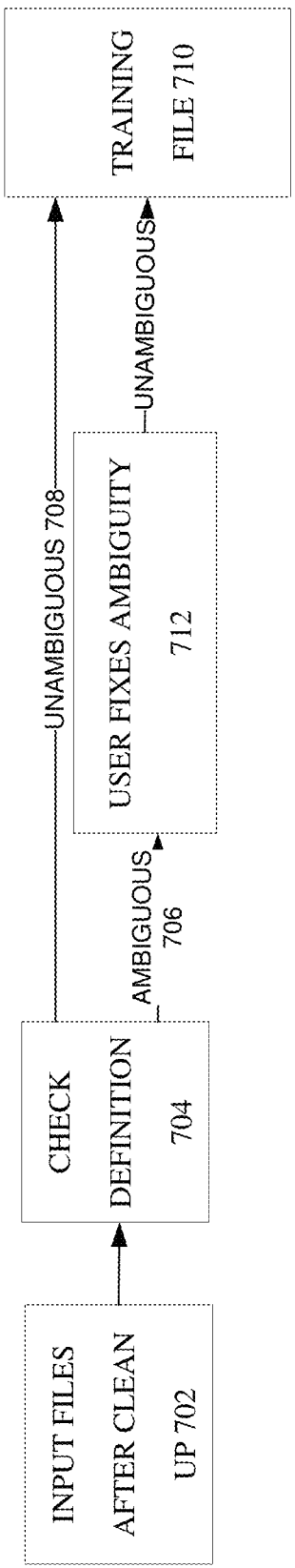
FIG. 7 illustrates the steps involved in preparing an input file for training, according to one embodiment.

FIG. 7 illustrates the steps involved in preparing an input file for training, according to one embodiment. Input files after the preparation and clean up phase 702 may be checked for definition 704. The definition may be one or more of an ambiguous 706 and/or unambiguous 708. In case of unambiguous 708, the input files and/or extracted content of the input files may be added to training file 710. In case of ambiguity 706, a user may be prompted to fix one or more ambiguities 712 and then the fixed ambiguous input may be added to the training file 710.

Figure 8:
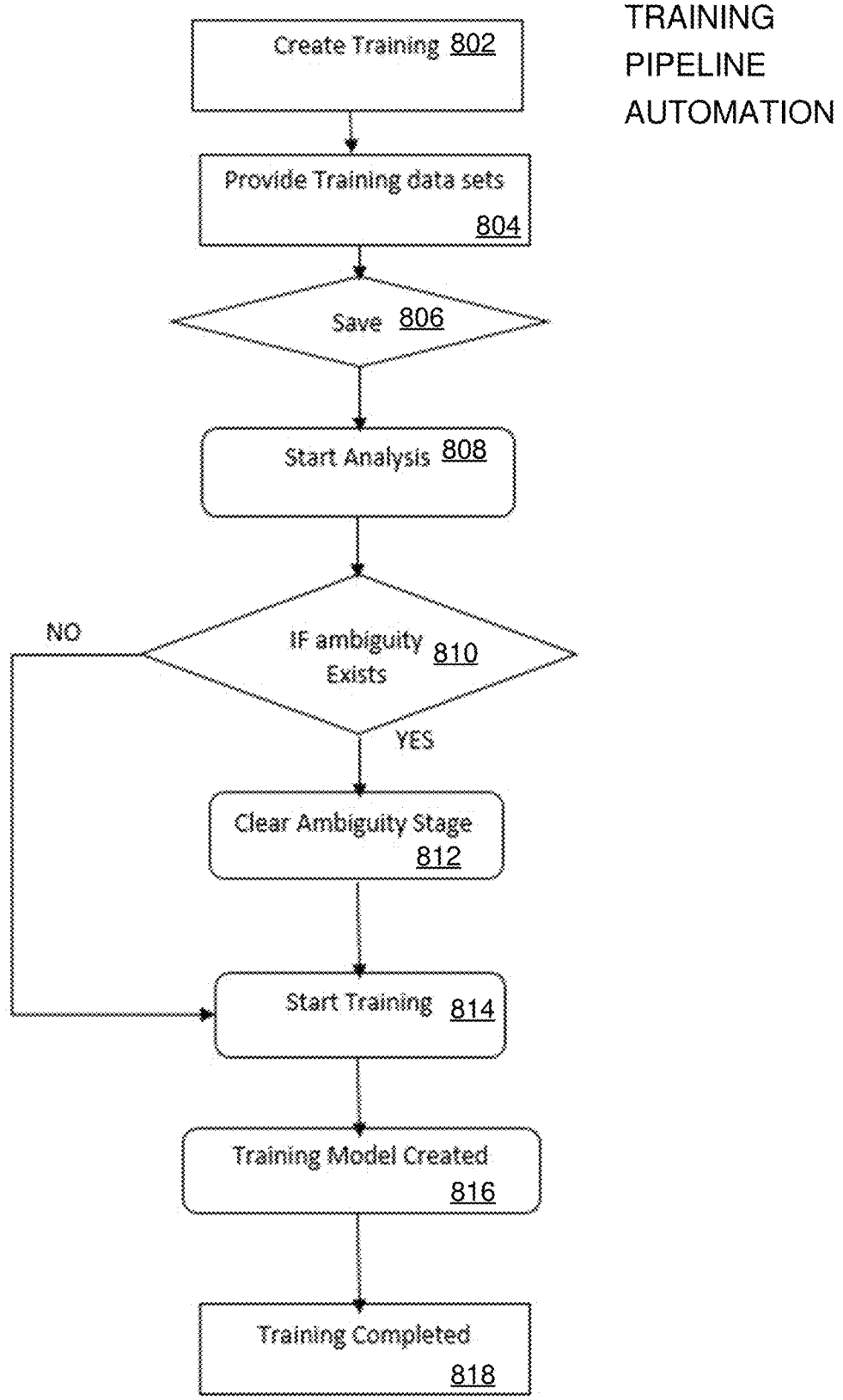
FIG. 8 is flow chart depicting the various steps of automating a training pipeline, according to one embodiment.

FIG. 8 is flow chart depicting the various steps of automating a training pipeline, according to one embodiment. The various steps involved in automating a training pipeline may include creating a training 802, providing training data sets 804, saving 806, and start analysis 808. Further, a check may be necessary to check for ambiguity 810. In case of ambiguity, an ambiguity clearance may be needed 812 before start of training 814. If there is no ambiguity, training is started 814. A trained model may be created 816 before training is completed 818.

Figure 9:
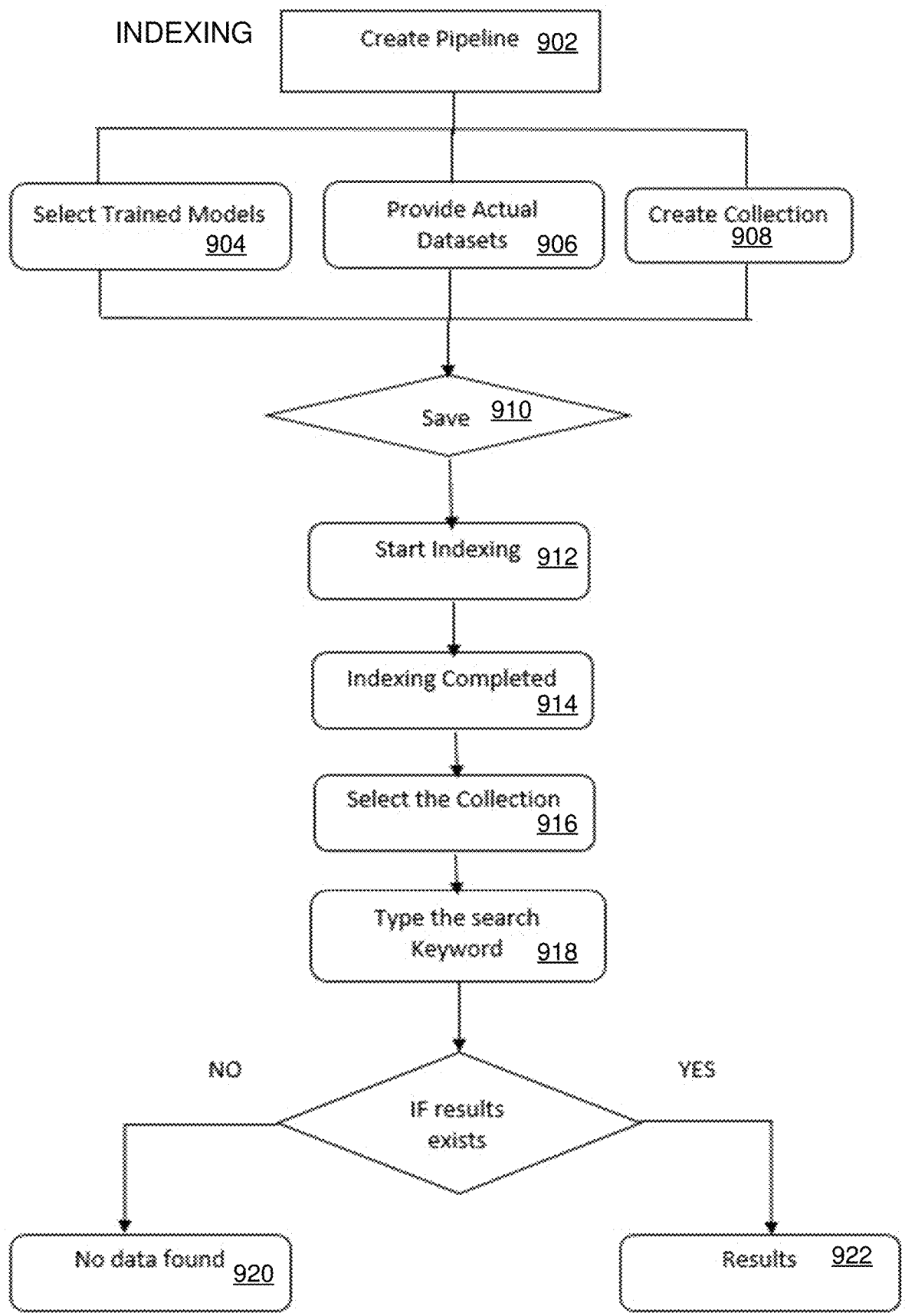
FIG. 9 is flow chart depicting the various steps of indexing, according to one embodiment.

FIG. 9 is flow chart depicting the various steps of indexing, according to one embodiment. The various steps of indexing may include creating a pipeline 902, selecting trained models 904, providing actual datasets 906, creating collections 908 and saving 910.

Once data may be saved, indexing is started 912 and completed 914. A collection may be selected 916 and a keyword search may be initiated 918. If results exist, results may be displayed through a user interface 922. If there are no results, then a pop up displaying no data found may be displayed 920.

Figure 10:
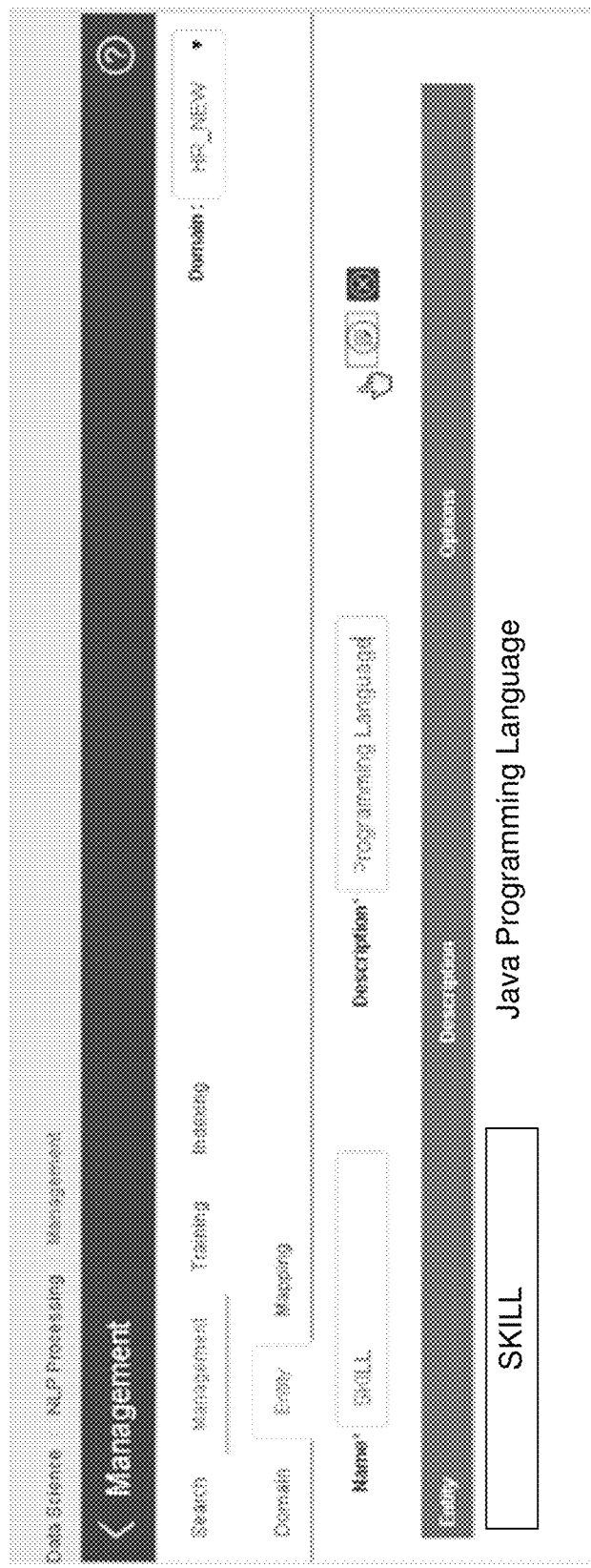
FIG. 10 is a screenshot illustrating, defining the domain for an entity through and administration module, according to one or more embodiments.

FIG. 10 is a screenshot illustrating, defining the domain for an entity through an administration module, according to one or more embodiments. In one or more embodiments, the domain specification for the entity may be defined when one or more documents from which the word needs to be extracted and labelled, are received through an administration module.

FIG. 11 is a screenshot illustrating ambiguity clearance, according to one or more embodiments. In one or more embodiments, a user may be prompted to fix one or more ambiguities and then the fixed ambiguous input may be added to the training file. The user may be allowed to fix ambiguity wherein the user may select the correct entity as illustrated in FIG. 11.

In one or more embodiments, one or more machine-readable media comprising machine-executable instructions cause a machine to perform a method automating training named entity recognition in natural language processing to build configurable entity definitions. The method comprises documents or entities received through an administration module. Further, a domain for each received entity is defined and received through the administration module. One or more entities corresponding to a domain specific entity in the received documents are determined as an entity ambiguity. A training file is generated to pick to a right parser, extract content or label the entity ambiguity. A resolved ambiguity for the entity ambiguity is collected and maintained in a repository, through a knowledge engine. Further, the method includes predicting, through the knowledge engine, one or more labelled ambiguous words and updating the knowledge engine through the collected resolved ambiguity. Data stored on a document store is fetched, through a training pipeline execution engine and each entity is associated, through the training pipeline execution engine, with one or more documents based on the fetched data from the document store.

In one or more embodiments, in resolving an ambiguity a user may consider a context of usage of an entity, domain of entity and meaning understood. Further, definitions of one or more domains may be received. One or more entity names may be defined in a plurality of domains.

In an example embodiment, a method of automating training named entity recognition in natural language processing to build configurable entity definitions. The method comprises documents (or inputs documents for example: .doc) or entities (search for 'Java') received through an administration module. Further, a domain for each received entity is defined through the administration module. An entity JAVA is to be searched in the input documents. A domain programming language may be defined for JAVA. One or more entities corresponding to a domain specific entity JAVA in the received documents are determined as an entity ambiguity. JAVA may be determined to a location or a programming language. A training file is generated to pick to a right parser, extract content or label the entity ambiguity. An ambiguity may be thrown onto a user interface wherein a user chooses JAVA to be a programming language when the context is of a document being a 'Resume' under the filed 'skills'. A resolved ambiguity for the entity ambiguity is collected and maintained in a repository, through a knowledge engine. The resolved ambiguity may be arrived at based on an input from a user. The user may clarify the usage of the entity associated with the resolved ambiguity to belong to certain domain and not belonging to another domain. The clarification may be based on a context of usage amongst other considerations. Further, the method includes predicting, through the knowledge engine, one or more labelled ambiguous words and updating the knowledge engine through the collected resolved ambiguity. Data stored on a document store is fetched, through a training pipeline execution engine and each entity is associated, through the training pipeline execution engine, with one or more entity definition documents based on the fetched data from the document store to build configurable entity definitions. The entity definition documents may include definitions of configurable entities.

In one or more embodiments, fetching, through a training pipeline execution engine, data stored on a document store. The data stored on the document store is relevant to associating between entities and entity definitions. For example, usage of 'Rome' in a certain context as a City may be fetched by the system. Therefore, the system may associate the entity 'Rome' with a document associated with a city ontology. The city ontology document may be an example of domain ontologies that the system may have access to. The domain ontologies may include domain specific entries for one or more entities.

Knowledge about entities can come from many different sources (e.g., gazetteers for geographic location names, databases of person names, census data, etc.) and appear in very different formats. The size of the knowledge bases can be very large.

In one or more embodiments, each entity may be associated with one or more entity definition documents. When an entity and the entity's usage in a certain context has already been defined in the one or more entity definition documents then when the system on encountering the entity for a second time or later can decipher automatically the usage intended based on the trained model.

In one or more embodiments, the system and method described herein may predict when the word may be found for a second and subsequent times (after the user or system resolved the ambiguity on a first time) and then the system is able to predict without human intervention. Further, data stored on a document store may include entity definitions.

In one or more embodiments, a process for automated training for named entity recognition process may be made available as a standalone module such as a widget, pop-up window, etc., embedded in other programs or modules, provided as a service, accessed via an application programming interface ("API"), etc. In other contexts, the recognition and disambiguation process used in the automated training of named entity recognition may be incorporated in powerful indexing and search tools, such as those used to provide relationship searches that find information based upon natural language analysis rather than merely keyword searching.

In one or more embodiments, Entities refer generally herein to people, places, or things. Entities are determined based upon recognizing mentions of entities and disambiguating those that potentially correspond to more than one entity. Entity disambiguation refers to the process for differentiating which entity is being referred to in a given piece of text when a recognized entity may correspond to more than one entity. The recognition and disambiguation process may further set up a correspondence between the determined entities and their corresponding entries stored in a knowledge repository and return a list of identified entities. In addition, the identified entities may be ranked and/or grouped based on their relevance/importance to the input text.

In one or more embodiments, one or more machine-readable media may include machine-executable instructions causing a machine to perform a method automating training named entity recognition in natural language processing to process configurable named entity definitions defining respective defined named entities. The method includes receiving one or more input documents and the named entity definitions. The named entity definitions specify defined named entities as named people, named places, or named things. The input documents may comprise unclassified occurrences of the named entities.

Further, the method includes receiving specific domain definitions of specific domains for classifying the named entities and in the input documents, identifying a named entity as a named entity ambiguity. The identifying includes determining that the named entity may belong to any one of a plurality of candidate domains out of the specific domains, generating a training file to pick to a right parser, extract content or label the named entity ambiguity and collecting a resolution of the named entity ambiguity for the named entity ambiguity. The resolution may indicate a particular one of the candidate domains.

The method further includes sending the collected resolution of the named entity ambiguity, the named entity ambiguity, and context for the named entity ambiguity to a knowledge engine for incorporation into the configurable named entity definitions, storing the collected resolution of the named entity ambiguity and incorporating the collected resolution of the named entity into the configurable named entity definitions. After incorporating the collected resolution into the configurable named entity definitions, the method includes predicting, through the knowledge engine, a correct classification of an unclassified named entity in the input documents.

In one or more embodiments, defining specific domains for the entities may be based on a received input of one or more domains associated with the one or more entity definitions or a domain definition document associated with the administration module.

In one or more embodiments, collecting a resolution of the named entity ambiguity may comprise of displaying a plurality of confirmation blocks containing excerpts appearing in the document. The excerpts contain an unclassified, ambiguous named entity associated with the named entity ambiguity and surrounding text as the text appears in an input document. Further, collecting a resolution of the named entity ambiguity includes displaying a proposed specific domain out of the defined domains for the plurality of excerpts. A single proposed specific domain may be displayed for more than one of the excerpts. Within the confirmation blocks, user interface elements may be displayed for confirmation or rejection of the excerpt as belonging to the proposed specific domain and activation of one user interface element may be received of the user interface elements, thereby indicating that the text in the excerpt does or does not belong to the single proposed specific domain.

Although the present embodiments have been described with reference to specific example embodiments, it will be evident that various modifications and changes may be made to these embodiments without departing from the broader spirit and scope of the various embodiments. For example, the various devices and modules described herein may be enabled and operated using hardware circuitry, firmware, software or any combination of hardware, firmware, and software (e.g., embodied in a machine-readable medium). For example, the various electrical structure and methods may be embodied using transistors, logic gates, and electrical circuits (e.g., application specific integrated (ASIC) circuitry and/or in Digital Signal Processor (DSP) circuitry).

In addition, it will be appreciated that the various operations, processes, and methods disclosed herein may be embodied in a machine-readable medium and/or a machine accessible medium compatible with a data processing system (e.g., a computer devices), and may be performed in any order (e.g., including using means for achieving the various operations). The medium may be, for example, a memory, a transportable medium such as a CD, a DVD, a Blu-Ray™ disc, a floppy disk, or a diskette. A computer program embodying the aspects of the exemplary embodiments may be loaded onto the retail portal. The computer program is not limited to specific embodiments discussed above, and may, for example, be implemented in an operating system, an application program, a foreground or background process, a driver, a network stack or any combination thereof. The computer program may be executed on a single computer processor or multiple computer processors.

Accordingly, the specification and drawings are to be regarded in an illustrative rather than a restrictive sense.

What is claimed is:

1. A method to automate training named entity recognition in natural language processing to build configurable entity definitions, the method comprising:

receiving at least one input document or one or more entities through an administration module;

defining a domain for each of the received entities or the at least one input document through the administration module;

determining one or more entities corresponding to a domain specific entity in the at least one input document;

generating a training file;

via the training file, picking a right parser;

via the training file, extracting content from the input document;

via the training file, labeling entity ambiguity, whereby a single training file is used to pick the right parser, extract content from the input document, and label entity ambiguity;

collecting and maintaining, through a knowledge engine, at least one user action in a knowledge repository, wherein the collecting comprises resolution of the entity ambiguity and comprises:

displaying a plurality of confirmation blocks containing excerpts appearing in the input document, wherein the excerpts contain an unclassified, ambiguous named entity associated with the entity ambiguity and surrounding text as the surrounding text appears in the input document, wherein the unclassified, ambiguous named entity is ambiguous because its domain overlaps with more than one domain, displaying a proposed specific domain for the excerpts, wherein a single proposed specific domain is displayed for more than one of the excerpts, within the confirmation blocks, displaying user interface elements for confirmation or rejection of a given excerpt out of the excerpts as belonging to the single proposed specific domain, receiving activation of one user interface element of the user interface elements, thereby resolving the entity ambiguity by indicating that text in the given excerpt out of the excerpts does or does not belong to the single proposed specific domain, and updating the knowledge engine with the resolved entity ambiguity;

predicting, through the knowledge engine, one or more labelled ambiguous entities;

fetching, through a training pipeline execution engine, data stored on a document store; and associating, through the training pipeline execution engine, each entity with one or more documents based on the fetched data from the document store to build configurable entity definitions;

wherein the act of generating the training file comprises:

extracting text from the input document;

determining a definition of the extracted text to be ambiguous or unambiguous; and based on whether the definition of the extracted text is determined to be ambiguous or unambiguous, switching between (a) and (b):

(a) adding the extracted text to the training file when the definition is determined to be unambiguous, and (b) prompting a user to resolve ambiguity, and adding the resolution of the ambiguity to the training file when the definition is determined to be ambiguous.

2. The method of claim 1, wherein the entities are defined in the knowledge repository; and wherein a trained model is generated through the training file.

3. The method of claim 1, wherein the knowledge repository comprises an ontology knowledge base.

4. The method of claim 1, wherein the entities are ranked through a relevance score.

5. The method of claim 1, wherein:

the user action is collected through a user interface associated with at least one of a web and mobile application.

6. The method of claim 1, wherein the knowledge engine is updated at pre-defined intervals.

7. The method of claim 1, wherein updating the knowledge engine with the resolved entity ambiguity comprises updating the knowledge engine with information that permits resolution of later-encountered ambiguities.

8. The method of claim 1, wherein the fetched data from the document store comprises one or more entity definition documents, the respective entity definition documents defining a usage of an entity in different contexts.

9. A system to automate training named entity recognition in natural language processing to build configurable entity definitions comprising:

a cluster computing network with one or more communicatively coupled nodes;
a distributed messaging system;
a distributed data warehouse;
a data processing engine;
an analytical engine;
at least one processor; and
at least one memory unit operatively coupled to the at least one processor communicatively coupled over the cluster computing network and having instructions stored thereon that, when executed by the at least one processor, cause the at least one processor to:

receive at least one input document or entity through an administration module associated with the distributed messaging system;

define a domain for each of the received entity or the at least one input document through the administration module in a document set;

determine one or more entities, through the data processing engine, corresponding to a domain specific entity in the document set;

generate, through the analytical engine, a training file;

via the training file, pick a right parser;

via the training file, extract content from the input document;

via the training file, label entity ambiguity, whereby a single training file is used to pick the right parser, extract content from the input document, and label entity ambiguity;

collect and maintain, through a knowledge engine associated with the distributed data warehouse, at least one user action in a knowledge repository, wherein the collecting comprises resolution of the entity ambiguity and comprises:

displaying a plurality of confirmation blocks containing excerpts appearing in the input document, wherein the excerpts contain an unclassified, ambiguous named entity associated with the entity ambiguity and surrounding text as the surrounding text appears in the input document, and wherein the unclassified, ambiguous named entity is ambiguous because its domain overlaps with more than one domain;

displaying a proposed specific domain for the excerpts, wherein a single proposed specific domain is displayed for more than one of the excerpts, within the confirmation blocks, displaying user interface elements for confirmation or rejection of a given excerpt out of the excerpts as belonging to the single proposed specific domain, receiving activation of one user interface element of the user interface elements, thereby resolving the entity ambiguity by indicating that text in the given excerpt out of the excerpts does or does not belong to the single proposed specific domain, and updating the knowledge engine, through the cluster computing network, with the resolved entity ambiguity;

predict, through the knowledge engine and the analytical engine, one or more labelled ambiguous entities;

fetch, through a training pipeline execution engine, data stored on a document store; and associate, through the training pipeline execution engine, each entity with one or more documents based on a trained model generated through the training file and the fetched data from the document store to build configurable entity definitions;

wherein the analytical engine is configured to generate the training file by: extracting text from the input document;

determining a definition of the extracted text to be ambiguous or unambiguous; and based on whether the definition of the extracted text is determined to be ambiguous or unambiguous, switching between (a) and (b):
(a) adding the extracted text to the training file when the definition is determined to be unambiguous, and
(b) prompting a user to resolve ambiguity, and adding the resolution of the ambiguity to the training file when the definition is determined to be ambiguous.

10. The system of claim 9, wherein the entities are defined in a knowledge repository.

11. The system of claim 10, wherein the knowledge repository is an ontology knowledge base.

12. The system of claim 9, wherein the entities are ranked through a relevance score.

13. The system of claim 9, wherein the user action is collected through a user interface associated with at least one of a web and mobile application.

14. The system of claim 9, wherein the knowledge engine is updated at pre-defined intervals.

15. The system of claim 9, wherein the cluster computing network is associated with a varying number of nodes.

16. One or more machine-readable media comprising machine-executable instructions causing a machine to perform a method automating training named entity recognition in natural language processing to process configurable named entity definitions defining respective defined named entities, the method comprising:
receiving one or more input documents and the named entity definitions, wherein the named entity definitions specify defined named entities as named people, named places, or named things, and the input documents comprise unclassified occurrences of the defined named entities;
receiving specific domain definitions of specific domains for classifying the defined named entities;
in the input documents, identifying a named entity as a named entity ambiguity, wherein the identifying comprises determining that the named entity ambiguity belongs to any one of a plurality of candidate domains out of the specific domains;
generating a training file to pick a right parser, extract content and label the named entity ambiguity, whereby a single training file is used to pick the right parser, extract content, and label entity ambiguity;
collecting a resolution of the named entity ambiguity for the named entity ambiguity through a user action via a user interface, wherein the resolution indicates a particular one of the candidate domains, and wherein the collecting comprises:
displaying a plurality of confirmation blocks containing excerpts appearing in the input documents, wherein the excerpts contain an unclassified, ambiguous named entity associated with the named entity ambiguity and surrounding text as the surrounding text appears in an input document, and wherein the unclassified, ambiguous named entity is ambiguous because its domain overlaps with more than one domain;
displaying a proposed specific domain out of the specific domains for the excerpts, wherein a single proposed specific domain is displayed for more than one of the excerpts,
within the confirmation blocks, displaying user interface elements for confirmation or rejection of a given excerpt out of the excerpts as belonging to the single proposed specific domain, and
receiving activation of one user interface element of the user interface elements, thereby resolving the named entity ambiguity by indicating that text in the given excerpt out of the excerpts does or does not belong to the single proposed specific domain;
sending the collected resolution of the named entity ambiguity, the named entity ambiguity, and context for the named entity ambiguity to a knowledge engine for incorporation into the configurable named entity definitions;
storing the collected resolution of the named entity ambiguity and incorporating the collected resolution of the named entity into the configurable named entity definitions; and
after incorporating the collected resolution into the configurable named entity definitions, predicting, through the knowledge engine, a correct classification of an unclassified named entity in the input documents;
wherein the act of generating the training file comprises:
extracting text from the input document;
determining a definition of the extracted text to be ambiguous or unambiguous; and
based on whether the definition of the extracted text is determined to be ambiguous or unambiguous, switching between (a) and (b):
(a) adding the extracted text to the training file when the definition is determined to be unambiguous, and
(b) prompting a user to resolve ambiguity, and adding the resolution of the ambiguity to the training file when the definition is determined to be ambiguous.

17. The one or more machine-readable media of claim 16, wherein defining specific domains for the defined named entities is based on a received input of one or more domains associated with the configurable named entity definitions or a domain definition document associated with an administration module.

\* \* \* \* \*